United States Patent [19]

Ratajczek

[11] Patent Number: 5,386,764
[45] Date of Patent: Feb. 7, 1995

[54] GRAIN ROASTER/COOLER WITH PREHEATER

[76] Inventor: William J. Ratajczek, P.O. Box 1173, Trempealeau, Wis. 54661

[21] Appl. No.: 97,878

[22] Filed: Jul. 27, 1993

[51] Int. Cl.$^6$ .......................................... A23N 12/10
[52] U.S. Cl. ........................................ 99/483; 99/470; 34/136; 34/560
[58] Field of Search .................... 34/136, 560; 99/470, 99/483, 484, 488; 198/841, 952; 368/23, 25

[56] References Cited

U.S. PATENT DOCUMENTS

| | | | |
|---|---|---|---|
| 2,055,941 | 9/1936 | Newhouse | 34/560 |
| 2,092,657 | 9/1937 | Smith | 34/560 |
| 3,143,428 | 8/1964 | Reimers | 99/483 |
| 3,372,488 | 3/1968 | Koch | 34/136 |
| 3,396,476 | 8/1968 | Eaves | 39/484 |
| 3,695,165 | 10/1972 | Slenkiewicz | 99/470 |
| 3,703,861 | 11/1972 | Slack | 99/470 |
| 4,421,020 | 12/1983 | Gross | 99/483 |
| 4,508,029 | 4/1985 | Malone | 99/483 |
| 4,660,468 | 4/1987 | Goldhahn | 99/483 |
| 4,724,953 | 3/1988 | Winchester | 198/841 |
| 5,002,398 | 3/1991 | Musil | 366/23 |
| 5,019,994 | 5/1991 | Rainville | 34/484 |

OTHER PUBLICATIONS

Gem Grain Roaster Brochure, Author: Unknown; Published Date: Unknown; Winona, Minn. 55987.
Ashworth Flat Wire Belts Brochure; Author: Unknown; Published 1968; Ashworth Bros., Inc; Winchester (VA-Bul#FW87).

Primary Examiner—Timothy F. Simone
Assistant Examiner—Terrence R. Till
Attorney, Agent, or Firm—Robert J. Harter

[57] ABSTRACT

A grain roaster/cooler includes a fuel saving preheater and a roasting drum that rotates within a stationary housing. Heat radiated from the drum is captured in the form of hot air trapped in an air gap between the drum and the housing. A fan draws from this hot air supply and discharges through the incoming grain being supplied to the roaster. The incoming grain is thus preheated as it recovers heat that would have otherwise been lost.

8 Claims, 2 Drawing Sheets

GRAIN ROASTER/COOLER WITH PREHEATER

DESCRIPTION

1. Field Of The Invention

The subject invention pertains to grain roaster/coolers, and more specifically to one having a preheater.

2. Description Of Related Art

In many cases, grain is passed through a roasting process to help sterilize the grain and inhibit the growth of mold and fungus. The grain is typically heated by an open flame as the grain is conveyed through a rotating drum. After roasting, an air cooled cooler is often used to cool the grain back down. A typical cooler uses a chain driven paddle wheel type conveyor to pull the grain across a perforated plate through which ambient air passes.

There are two major problems with today's roaster/coolers. A tremendous amount of heat is wasted in the roasting process. Secondly, the paddle wheel type conveyor tends to lump the grain together. This unequal distribution of the grain causes uneven and incomplete cooling.

SUMMARY OF THE INVENTION

To avoid the problems with present methods of roasting and cooling grain, it is an object of this invention to recover dry waste heat otherwise radiated from the drum to the atmosphere and use it in preheating moist grain before it enters the roasting drum.

Another object is to partially encapsulate a roaster's hot drum in an insulated shell to keep the exposed surface temperature of the roaster at a safe level. The lower surface temperature becomes an additional advantage when the roaster is operated indoors on an uncomfortably hot day.

Another advantage of encapsulating the rotating drum within a non-rotating shell is that an operator is shielded from moving parts that could cause injury.

Another object is to preheat grain with relatively clean dry air.

Another object is to preheat grain by discharging heated air directly into the grain to help fluidize the grain as it travels to the roaster.

Another object is to control the amount of preheat to avoid overheating the grain.

Another object of the invention is to equally distribute roasted grain over a cooling conveyor to ensure even and complete cooling.

These and other objects of the invention are provided by a novel roaster/cooler that includes a preheater that extracts heated air from between a hot rotating drum and an outer stationary shell, and delivers that heat to preheat the incoming grain. To complete the process, the roasted grain is evenly spread across a fine meshed conveyor through which relatively cool air passes.

DESCRIPTION OF THE PREFERRED EMBODIMENT

Structure

Figure 1:
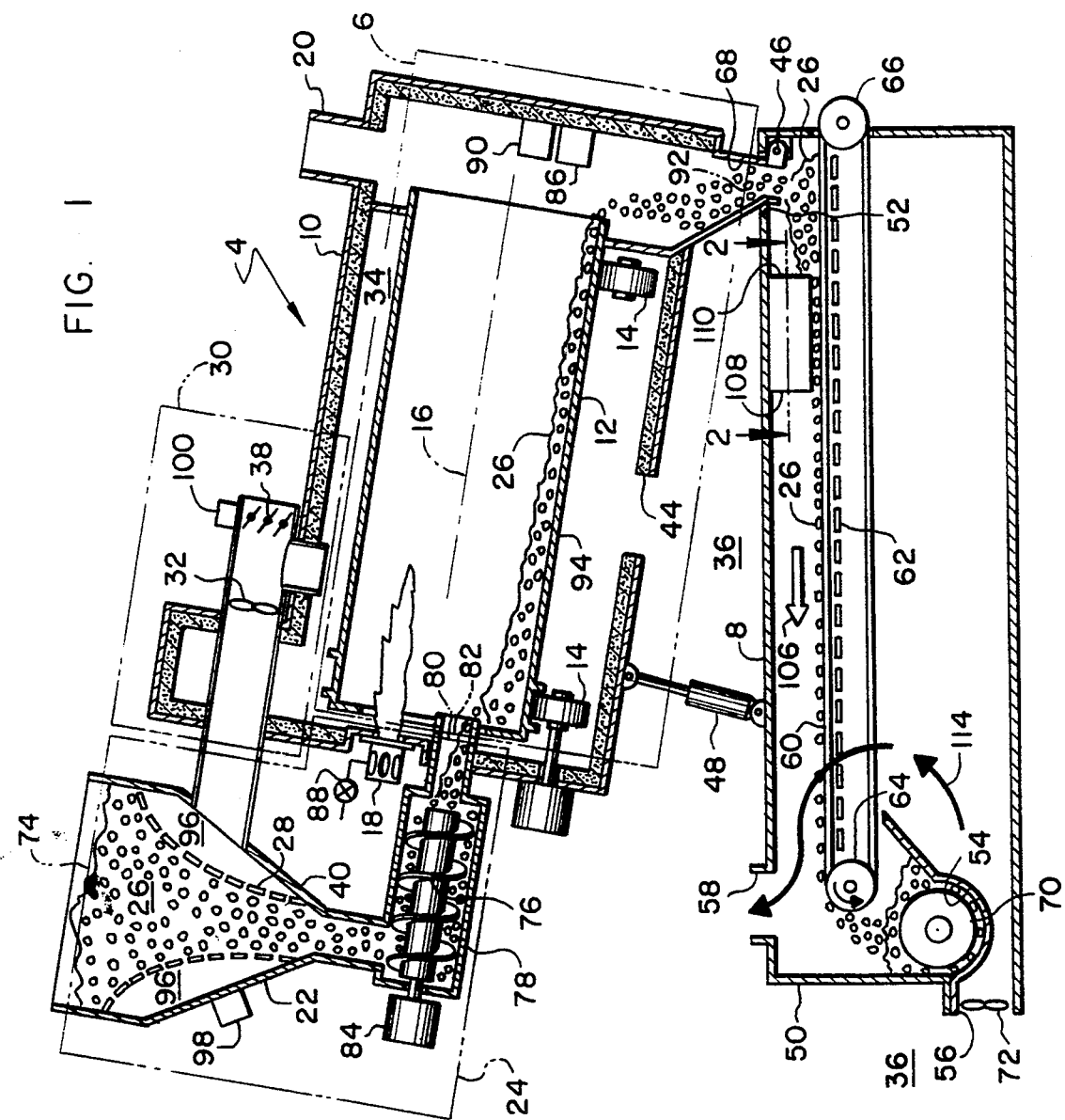
FIG. 1 illustrates a schematic cross-sectional side view of the invention.

A roaster/cooler system 4 of FIG. 1 includes a roaster 6 pivotally mounted relative to a cooler 8. Roaster 6 includes a generally stationary insulated shell 10 with a rotatable drum 12 inside. Drum 12 rests on a drive roller assembly 14 and is rotatable about its longitudinal center line 16. A gas burner 18 mounted to shell 10 serves as a heat source that discharges into drum 12. Combustion fumes are expelled from drum 12 and shell 10 through exhaust 20.

In one embodiment of the invention, a hopper 22 serves as a grain transferring device 24 that supplies roasting drum 12 with grain 26. Hopper 22 includes a lining of finely perforated plate 28. Hopper 22 is coupled to roaster 6 by way of a preheater 30.

Preheater 30 includes a fan 32 that draws from an air gap 34 between shell 10 and drum 12. Fan 32 also draws in ambient air 36 through adjustable damper 38. Fan 32 discharges into hopper 22 and through its perforated lining 28 which is attached to its side wall 40. Make up air 36 is drawn into air gap 34 via air inlet 44.

Roaster 6 pivots about a pin 46 (a pivot point) upon varying the height of roaster 6 at jack 48. In one embodiment of the invention, pin 46 and jack 48 are attached to cooler 8.

Cooler 8 includes a housing 50 with a grain inlet 52, a grain outlet 54, an air inlet 56 and an air outlet 58. Inside housing 50 is a conveyor 60 supported by a perforated plate 62, a drive roller 64 and an idler roller 66. Conveyor 60 conveys grain 26 from inlet 52 to outlet 54. Grain inlet 52 of cooler 8 is in fluid communication with a roaster outlet 68. Grain outlet 54 of cooler 8 includes a discharge auger 70 that conveys grain 26 out of cooler 8.

A cooling fan 72 forces ambient air 36 through air inlet 56, up through conveyor 60, and out through air outlet 58.

Operation

Grain 26 at a first temperature enters hopper 22 at a transfer inlet 74. Grain 26 is conveyed by a feed auger 76 through a conduit 78 and is expelled at a second temperature through a transfer outlet 80. Here grain 26 enters drum 12 at a roaster inlet 82. The flow rate of grain 26 entering drum 12 is modulated by feed auger drive motor 84 in response to the temperature inside drum 12 as sensed by a temperature sensor 86. The flow rate is increased with an increase in temperature. In addition, if the temperature inside drum 12 becomes excessively hot, gas valve 88 shuts burner 18 off in response to temperature sensor 90 detecting a predetermined upper temperature limit.

Roller assemblies 14 rotate drum 12 which causes grain 26 to travel the length of drum 12. As grain 26 passes through drum 12, burner 18 raises the surface temperature of grain 26 up to a third temperature upon grain 26 reaching roaster outlet 92.

During the roasting process, the exterior surface 94 of drum 12 becomes hot, causing heat to radiate outward. This heat is captured in air gap 34 between drum 12 and shell 10. Fan 32 draws hot air out of air gap 34 and discharges in into a plenum 96 defined by the space between perforated lining 28 and a side wall 40 of hopper 22. The heated air passes through perforated plate 28 and preheats grain 26 as it passes through grain 26 in hopper 22.

If the air temperature in plenum 96 gets too hot, as measured by temperature sensor 98, damper 38 opens to mix cooler ambient air 36 with the air drawn from air gap 34. The degree of opening of damper 38 is controlled by damper drive motor 100 in response to sensor 98.

It's been found that adequate preheat operation is realized when the roast heat to preheat ratio is less than 10 where the roast heat to preheat ratio is defined as the roast heat temperature differential divided by the preheat temperature differential. And the preheat temperature differential is defined as the temperature of the grain at transfer outlet 80 minus the temperature of the grain at transfer inlet 74, while the roast heat temperature differential is defined as the temperature at roaster outlet 92 minus the temperature at roaster inlet 82. It should be clear that transfer outlet 80 and roaster inlet 82 is a transitional point of substantially equal grain temperature. It should also be noted that the grain temperatures mentioned herein are average temperatures of the grain surface as measured by a thermometer immersed in grain aggregate.

Figure 2:
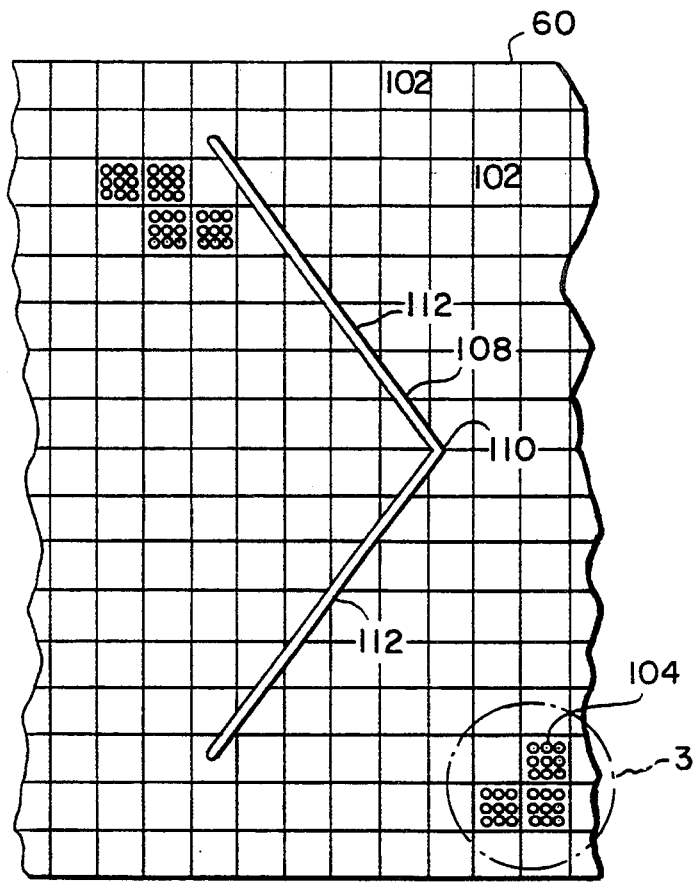
FIG. 2 is a schematic cross-sectional top view of a portion of the cooler with the grain omitted.

Once grain 26 is roasted, it leaves roaster 6 through outlet 92 and enters cooler 8 through grain inlet 52. Grain 26 falls onto conveyor 60. Conveyor 60 is a link belt type conveyor having numerous belt openings as shown in FIG. 2. In one embodiment of the invention, belt 60 is a Model A2 with a 1"×1" mesh manufactured by Ashworth Bros., Inc., of Winchester, Va. Grain 26 falls into openings 102 but is prevented from falling completely through by perforated plate 62 which lies underneath belt 60. Plate 62 has small air passage perforations 104 that are generally too small for grain 26 to fall through. In one embodiment of the invention, perforations 104 are 5/32 inches in diameter. In another embodiment of the invention, perforations 104 are 3/32 inches in diameter.

As belt 60 pushes grain 26 over plate 62 in the direction indicated by arrow 106, grain 26 is evenly spread out by a grain spreader 108. Spreader 108 is a bent plate having a nose portion 110 upstream of two wing portions 112.

Figure 3:
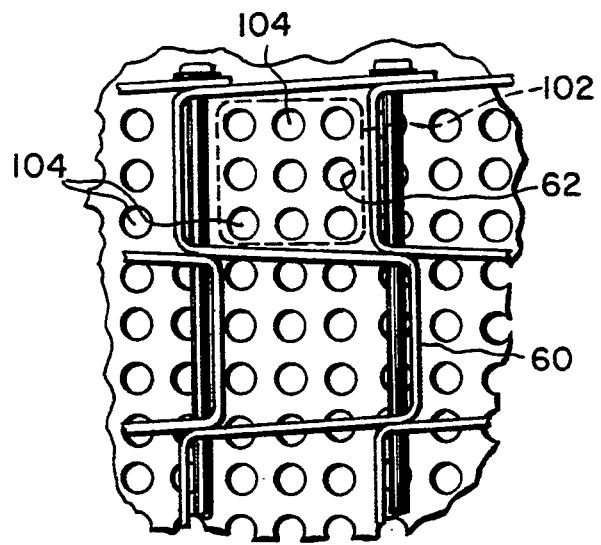
FIG. 3 is an enlarged view of a portion of FIG. 2.

As grain 26 continues to travel downstream of spreader 108, grain 26 is cooled by a current of air 114 passing upward through perforations 104 of plate 62 and through openings 102 of conveyor 60. This current of air is generated by fan 72. It's been found that for even and complete cooling the ratio of the area of the average perforation 104 of plate 72 divided by the average opening area 102 of belt 60 is in the range of 0.002 to 0.08. FIG. 3 shows perforations 104 being smaller than opening 102, but for clarity the two areas are not drawn to scale.

Once grain 26 is cooled, conveyor 60 drops grain 26 onto discharge auger 70 which discharges grain 26 out of roaster/cooler 4 through grain outlet 54 to complete the process.

The use of the term "grain" used herein refers to the seed or fruit of any plant. Examples of grain include but are not limited to: soybean, rice, beans, corn, oat, sunflower, cotton, milo, and coffee. The term "preheater" used herein refers to any one of a variety of means for delivering heat from the roaster to the grain before it enters the roaster. The one described herein is lust one example of a preheater. Examples of other preheaters well within the scope of the invention include but are not limited to: conventional heat exchangers, tube and shell heat exchangers, fin and tube heat exchangers, stacked plate heat exchangers, and heat pipes. The use of the term "grain transferring device" used herein simply refers to any device used in delivering grain to the roaster.

Although the invention is described with respect to a preferred embodiment, modifications thereto will be apparent to those skilled in the art. Therefore, the scope of the invention is to be determined by reference to the claims which follow:

I claim:

1. A temperature conditioning apparatus for processing grain; comprising:

a grain transferring device adapted to pass said grain therethrough, said grain transferring device having a transfer inlet adapted to receive said grain at a first temperature, said grain transferring device having a transfer outlet adapted to expel said grain at a second temperature with said second temperature being greater than said first temperature to provide a preheat temperature differential;

a roaster having a rotatable drum adapted to pass said grain therethrough, said drum being open at one end to define a roaster inlet coupled to said transfer outlet and being adapted to receive said grain at said second temperature, said drum being open at an opposite end to define a roster outlet adapted to expel said grain at a third temperature with said third temperature being greater than said second temperature to provide a roaster temperature differential;

a heat source adapted to discharge heat into said rotatable drum to directly heat said grain passing therethrough;

a shell disposed over a portion of said drum, said shell having portions spaced apart from said drum to define an air gap therebetween; and a preheater in heat absorbing relationship with said roaster and in heat emitting relationship with said grain transferring device, said preheater being adapted to force heated air at a fourth temperature from said air gap and toward said grain transferring device, whereby said grain in said grain transferring device is preheated before entering said rotatable drum of said roaster.

2. The apparatus of claim 1, further comprising a pivot point about which said roaster is pivotable to vary an angular latitude of a rotational center line of said rotatable drum.

3. The apparatus of claim 1, wherein said grain transferring device includes a hopper with a perforated lining.

4. The apparatus of claim 1, further comprising a damper associated with said preheater, said damper being adapted to convey ambient air at a fifth temperature that is cooler than said heated air at said fourth temperature, said preheater being adapted to mix said heated air and said ambient air.

5. The apparatus of claim 4, further comprising a damper drive coupled to said damper and a first temperature sensor associated with said grain transferring device, said damper drive being adapted to vary an extent to which said damper is open in response to said first temperature sensor.

6. The apparatus of claim 1, further comprising a cooler housing having a grain inlet in fluid communication with said roaster outlet; a grain outlet adapted to expel said grain; an air inlet; an air outlet; a first roller coupled to said cooler housing; a second roller coupled to said cooler housing; a link belt attached to said first roller and said second roller, said link belt having a plurality of belt openings each having a first specific opening area adapted to convey a flow of said grain through said cooler; a perforated plate laying under a portion of said link belt, said perforated plate having a plurality of plate openings each having a second specific opening area; and a fan adapted to force air in series flow relationship from outside said housing, through said air inlet, through said plurality of plate openings, through a portion of said plurality of belt openings, and through said air outlet to outside of said housing.

7. A temperature conditioning apparatus for processing grain comprising:
   a cooler housing having a grain inlet adapted to receive said grain, said cooler housing having a grain outlet adapted to expel said grain, an air inlet, and an air outlet;
   a first roller coupled to said cooler housing;
   a second roller coupled to said cooler housing;
   a link belt attached to said first roller and said second roller, said link belt having a plurality of belt openings each having a first specific opening area adapted to convey a flow of said grain through said cooler;
   a perforated plate laying under a portion of said link belt, said perforated plate having a plurality of plate openings each having a second specific opening area, said second specific opening area divided by said first specific opening area being in the range of 0.002 to 0.08;
   a fan adapted to force air in series flow relationship from outside said housing, through said air inlet, through said plurality of plate openings, through a portion of said plurality of belt openings, and through said air outlet to outside of said housing; and
   a grain spreader substantially uniformly spaced apart and above said link belt said spreader having a nose portion and two wing portions, said nose portion being between said two wing portions, said nose portion being further upstream of said wing portions relative to said flow of said grain being conveyed by said link belt, said grain spreader serving to level and distribute said grain over said link belt as said link belt conveys said grain under said spreader.

8. The apparatus of claim 7, further comprising:
   a roaster pivotally coupled to said cooler housing, said roaster having a rotatable drum adapted to pass grain therethrough and discharge to said grain inlet of said cooler; and a heat source adapted to discharge heat into said rotatable drum to directly heat said grain passing therethrough.

* * * * *